US007906881B2

(12) United States Patent
Enomoto et al.

(10) Patent No.: US 7,906,881 B2
(45) Date of Patent: Mar. 15, 2011

(54) MOTOR

(75) Inventors: Yuji Enomoto, Hitachi (JP); Motoya Ito, Hitachinaka (JP); Ryoso Masaki, Hitachi (JP); Koichiro Ohara, Chiba (JP); Masahiro Mita, Fukaya (JP); Matahiro Komuro, Hitachi (JP); Masahiro Masuzawa, Fukaya (JP)

(73) Assignees: Hitachi, Ltd., Tokyo (JP); Hitachi Industrial Equipment Systems Co., Ltd., Tokyo (JP); Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/429,946

(22) Filed: May 9, 2006

(65) Prior Publication Data

US 2006/0255894 A1 Nov. 16, 2006

(30) Foreign Application Priority Data

May 10, 2005 (JP) ................................ 2005-136789

(51) Int. Cl.
*H02K 1/27* (2006.01)

(52) U.S. Cl. ................................ 310/156.43; 310/75 D

(58) Field of Classification Search ................ 310/75 D, 310/156.43
See application file for complete search history.

(56) References Cited

U.S. PATENT DOCUMENTS

| 4,178,234 A * | 12/1979 | Bobo ............................... 494/26 |
| 4,698,273 A * | 10/1987 | Komuro et al. ................ 428/635 |
| 5,221,503 A * | 6/1993 | Ward et al. ..................... 264/104 |
| 5,710,474 A * | 1/1998 | Mulgrave ........................ 310/254 |
| 5,898,253 A * | 4/1999 | El-Antably et al. ........... 310/261 |
| 6,111,332 A * | 8/2000 | Post .............................. 310/90.5 |
| 6,218,757 B1 * | 4/2001 | Ong et al. ...................... 310/223 |
| 6,342,108 B1 * | 1/2002 | Lashmore et al. ............. 148/306 |
| 6,657,344 B2 * | 12/2003 | Post .............................. 310/90.5 |
| 6,809,439 B2 * | 10/2004 | Iwase et al. ................. 310/49 R |
| 6,998,756 B2 * | 2/2006 | Ishii .............................. 310/261 |
| 2002/0180294 A1 * | 12/2002 | Kaneda et al. ........... 310/156.43 |
| 2002/0180295 A1 * | 12/2002 | Kaneda et al. ........... 310/156.43 |
| 2003/0106615 A1 * | 6/2003 | Hirota et al. .................. 148/101 |
| 2003/0117032 A1 * | 6/2003 | Komuro et al. .......... 310/156.08 |
| 2005/0001499 A1 * | 1/2005 | Calico ....................... 310/156.08 |
| 2005/0040721 A1 * | 2/2005 | Kusase et al. ............ 310/156.43 |
| 2005/0081959 A1 * | 4/2005 | Kim et al. ...................... 148/105 |

(Continued)

FOREIGN PATENT DOCUMENTS

CN 1234589 11/1999

(Continued)

*Primary Examiner* — Quyen Leung
*Assistant Examiner* — Naishadh N Desai
(74) *Attorney, Agent, or Firm* — Antonelli, Terry, Stout & Kraus, LLP.

(57) ABSTRACT

It is desired to design a coreless motor in which a gap size is set to be as small as possible, and a magnet having a large energy product is used in order to increase the gap magnetic flux density since the coreless motor has no iron core so that the magnetic flux density is small in the gap part. A rotor core of the motor has a permanent magnet rotor which is formed by a compression molding means, and which is formed of a compact formed by molding a powder material, the compact comprising a bond magnetic portion mainly composed of a binder and a magnetic powder, and a soft magnetic portion mainly composed of a binder and a soft magnetic powder, the bond magnetic portion having magnetic poles having at least one surface which is mechanically bonded to the soft magnetic portion, in order to solve the inherent problems.

17 Claims, 7 Drawing Sheets

U.S. PATENT DOCUMENTS

2006/0006754 A1* 1/2006 Calico .................. 310/156.43
2006/0222848 A1* 10/2006 Satsu et al. ................ 428/403

FOREIGN PATENT DOCUMENTS

| | | |
|---|---|---|
| EP | 0 556 914 | 8/1993 |
| EP | 1 300 210 | 4/2003 |
| EP | 1 354 653 | 10/2003 |
| JP | 04058747 * | 2/1992 |
| JP | 8-214498 | 8/1996 |
| JP | 2003-282312 | 10/2003 |
| JP | 2003-319620 | 11/2003 |
| JP | 2004-015906 | 1/2004 |
| JP | 2004-056897 | 2/2004 |
| JP | 2005-020991 | 1/2005 |

* cited by examiner

FIG. 1
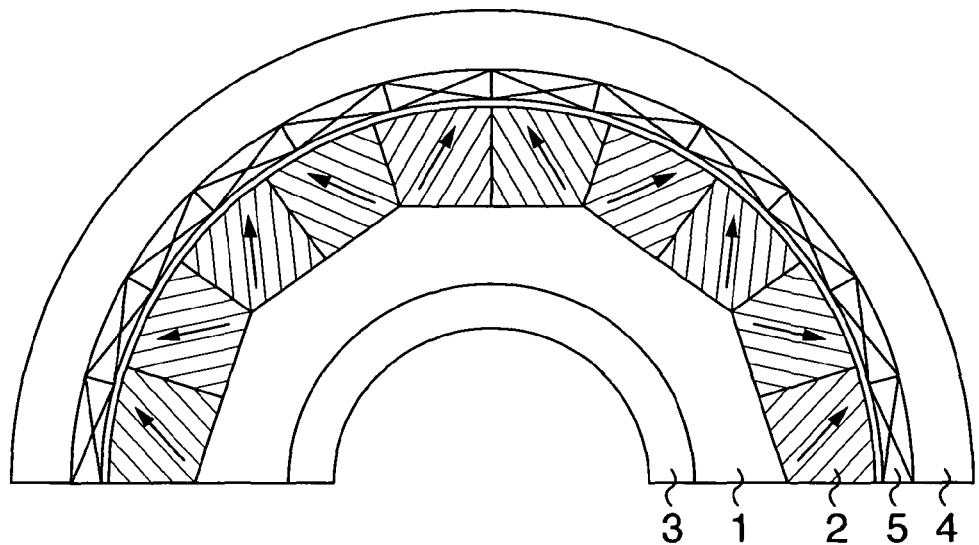
3  1  2  5  4
FIG. 2A
MAGNETIC POWDER 8
BINDER 9
BLEND
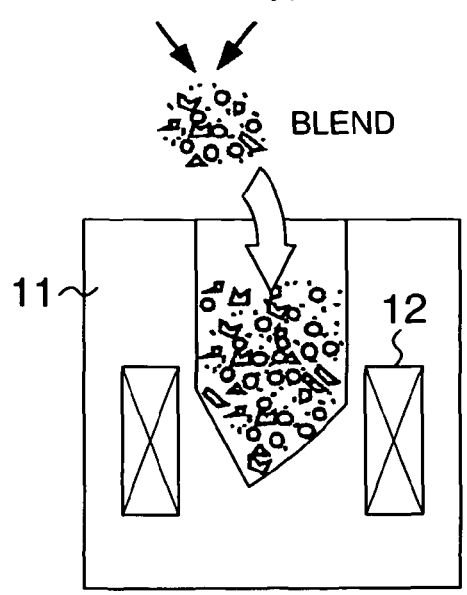
PROVISIONAL MOLDING DIE
FIG. 2B
PRESSING PRESSURE
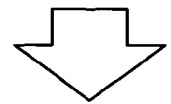
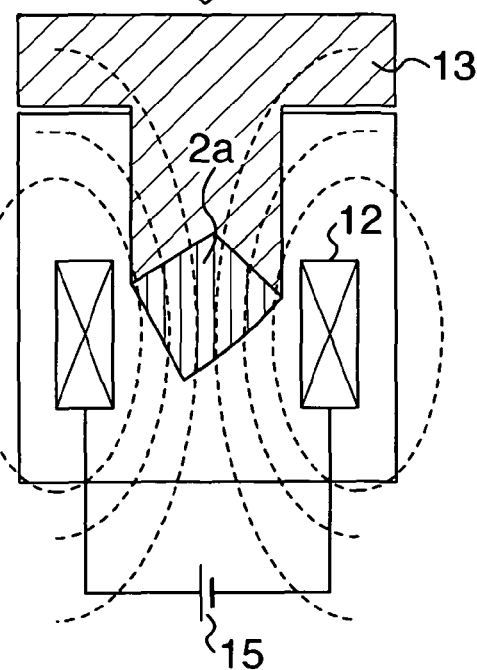

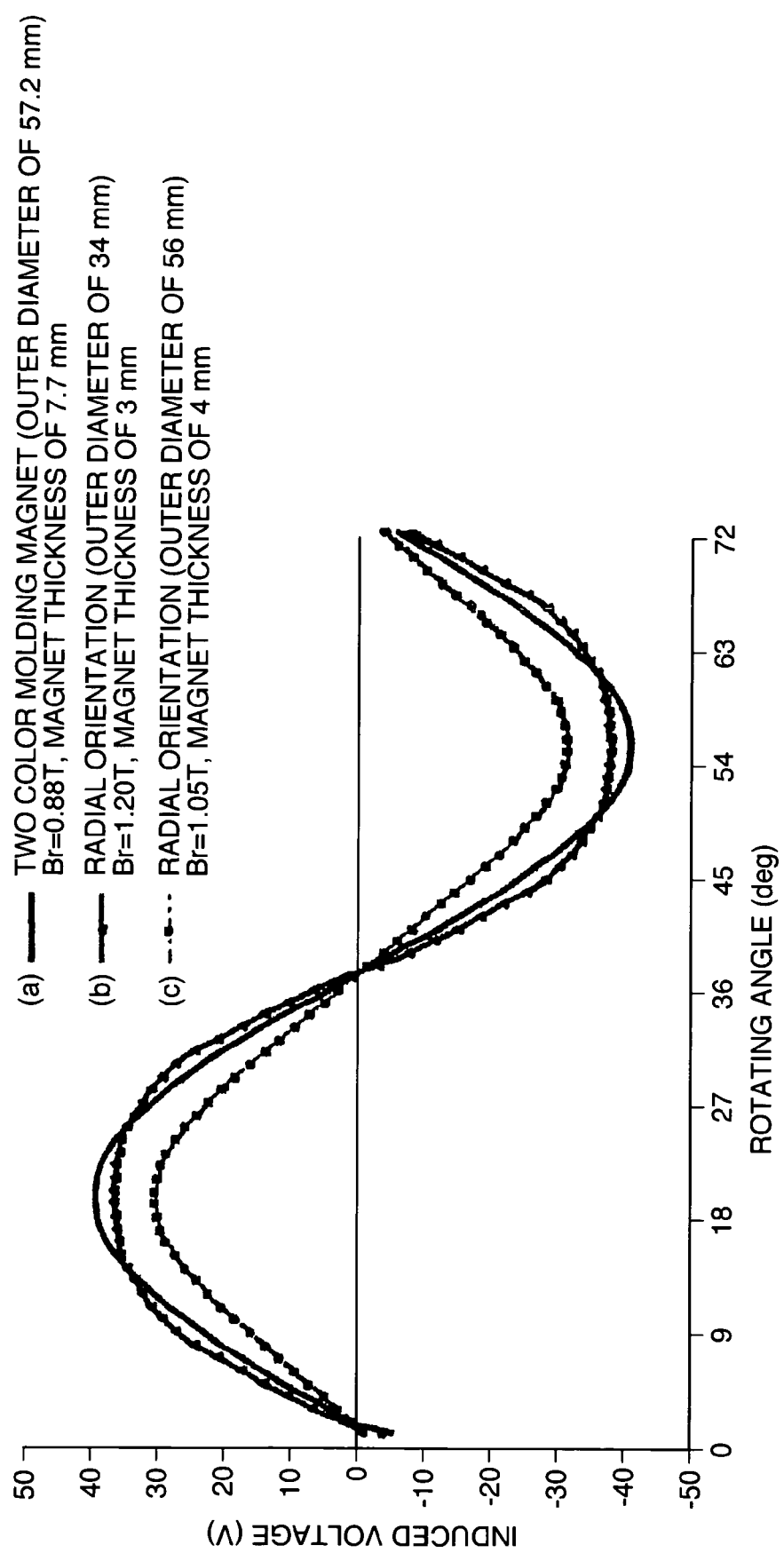

COIL IS CIRCUMFERENTIALLY ARRANGED ON BACK YOKE

INTEGRALLY MOLDING

MOTOR

BACKGROUND OF THE INVENTION (1) Field of the Invention

The present invention relates to a structure of a motor which materializes an inexpensive permanent magnet motor adapted to be used in the field of industry, electronic appliances or automobiles, and being capable of outputting a high power coggingless toque.

(2) Description of Related Art

The so-called motor is used as a drive equipment which converts electric power into mechanical power in the field of industry, electric appliances and automobiles. World-wise demands for energy saving, the provision of motors having a high conversion efficiency are required. However, in addition of the enhancement of the efficiency, miniaturization of motors is also important, and accordingly, for example, magnetic motors utilize magnets each having a high energy product and containing a rare earth material, or a stator core having a higher coil density manufactured by a segmented core process.

However, coreless motors having no stator magnetic poles have to be used in a certain technical field since there would be caused a problem of pulsating torque, that is, the so-called cogging torque due to the relationship between the number of poles of magnets and the number of slots in a stator core in view of a high energy product of the magnets. In general, these motors have less cogging torque but has an energy conversion efficiency lower than that of permanent magnet motor each having a stator core.

The output torque of the coreless motor may be improved in such a way that the magnets are oriented in view of anisotropy thereof as disclosed in JP-A-2004-15906, JP-A-2004-56897 and JP-A-2005-20991. In this way, ring magnets which have been manufactured being magnetically isotropic are magnetized so as to change their magnetizing directions, but difficult problems have been encountered in the case of magnets having large thickness or in the case of magnetization in complicated magnetizing direction.

Further, in the case of magnets having a diameter exceeding 50 mm, the manufacture of ring magnets are difficult, and further, since a thermal expansion coefficient becomes negative in the case of ring magnets having a radial magnetizing direction, there would be caused such a problem that the magnets are broken or cracked due to temperature variation at a point of variation of the magnetizing direction, and so forth. Thus, usual ring magnets are protected at their outer surface with a binding tape containing glass fibers, carbon fibers or the like or with a thin metal wall cylinder made of stainless steel or the like, and so forth, after they are formed into a rotor. In the case of a magnet rotor formed of segment-like magnets other than ring magnets, that is, magnet segments bonded together for every pole, the outer peripheral surface of the rotor is in general protected with a binding tape or a metal cylinder as stated above.

BRIEF SUMMARY OF THE INVENTION

The present invention is devised in view of such a problem that a coreless motor has no iron core so that the magnetic flux density becomes lower at its gap part, and accordingly it is desirable to design a rotor in which a gap size is decreased as possible as it can, and a magnet having a large energy product is utilized in order to increase the gap flux density. However, should sintered rare earth magnets having a large energy product be used, an extra gap in the thicknesswise part of a member for mechanically protecting the magnets would be required in view of the above-mentioned cracking problem. Further, in the case of a rotor composed of bond magnets (a compact of magnetic powder and resin binder), it is difficult to constitute the rotor with sintered rare earth magnets even though the magnets have large thickness.

Further, as to another problem, if the outer diameter of a rotor becomes larger than 50 mm, the magnetic fluxes of magnets per pole are abruptly increased, the number of magnetic poles should be increased more or less in dependence upon a diameter of the rotor in order to reduce the number of magnets to be used. With a multiple magnetic pole configuration, a drive frequency of a motor becomes higher, there would be caused a problem of occurrence of eddy currents in magnets, a rotor core and a stator yoke, and a problem of lowering the efficiency of the motor. In order to solve this problem, it is preferable to use magnets having itself a higher electric resistance, and accordingly, bond magnets are used in order to decrease eddy current, but it is at present difficult to obtain a high output torque in comparison with the sintered rare earth magnets.

In view of the above-mentioned problems, an object of the present invention is to propose a method which may satisfy desire of enhancing both output torque and efficiency of a motor with the use of rare earth bond magnets.

According to the present invention, in order to solve the problems stated above, there is provided a permanent magnet rotor of a motor, having a motor rotor core made of a compact formed by compacting a powder material, the compact being composed of a bond magnetic portion mainly formed of a binder and a magnetic powder, and a soft magnetic portion mainly made of a binder and a soft magnetic material, and being formed with the use of a compression molding means, wherein a rotor structure in which the bond magnetic portion has magnetic poles having at least one surface mechanically coupled to the soft magnetic portion. Further, according to the present invention, there is provided a rotor for motor having such a structure that the bond magnetic portion is composed of magnetic segments each being manufactured at a provisional forming step, and being applied with anisotropy during the provisional forming step in order to cause the rotor to have a plurality of magnetic poles obtained from the anisotropy, and being thereafter magnetized by a magnetizing filed during a final forming step. Further, according to the present invention, there is provided a method of forming a rotor, in which during the final forming step, the rotor is formed integrally with a rotor shaft, and accordingly, a rotor product may be manufactured with a high degree of accuracy by a single forming process. The rotor manufactured by this method, has a high mechanical strength, and accordingly, has such a feature that no protecting measure for protecting the outer surface of the rotor with a binding tape or the like, or with a thin metal cylinder made of stainless steel or the like and fitted thereon is required.

The coreless motor according to the present invention, has an increased mechanical strength so as to eliminate the necessity of a protecting means for protecting the outer surface of the rotor with a binding tape or a thin metal rotor made of stainless steel and fitted thereon, and accordingly, may have a decreased gap, thereby it is possible to expect an increased output power.

Since substantially no eddy current loss is caused even at a high output power due to the anisotropy of the bond magnets, and accordingly, it is possible to provide a small sized motor having a high degree of efficiency. Further, there may be provided a motor capable of maintaining a coggingless torque property which is inherently owned by a coreless motor.

Thus, it is possible to materialize miniaturization of an automobile, an electric appliance and an industrial drive system using the motor, and enhanced efficiency, control ability and enhanced manipulatability of a system product.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 1 is a sectional view illustrating a permanent magnet motor serving as a hollow shaft motor according to the present invention;

FIGS. 2(a) and 2(b) are views for explaining a method of provisionally forming a rotor magnet according to the present invention;

FIG. 7 is a view illustrating comparisons among induced voltages of motors having different structures.

DETAILED DESCRIPTION OF THE INVENTION

In view of the object of simultaneously satisfying both desire of miniaturization and enhanced efficiency of a motor, and desire of a coggingless torque property thereof, which does not compromise with the former, there is provided, in order to solve the above-mentioned problems, such a rotor structure that a stator yoke is formed of a high density SMC (soft magnetic composite), and the stator side is composed of a coil compact which is extremely thin in a radial direction. The rotor side is formed of a compact of a powder material, the compact being composed of a bond magnetic portion mainly made of a binder and a magnetic powder, and a soft magnetic portion mainly made of a binder and a soft magnetic material, and being molded with the use of a compression molding means, wherein the bond magnetic portion has magnetic poles having at least one surface which is mechanically coupled to the soft magnetic portion. Further, there is provided a rotor having such a feature that the bond magnet is formed of segments each manufactured by a provisional forming process and being applied with anisotropy during the provisional forming process, and the rotor is formed by a final forming process, having a plurality of magnetic poles obtained from the anisotropy, and is thereafter magnetized by a magnetic field. Explanation will be hereinbelow made of specific embodiments of the present invention with reference to the accompanying drawings.

EMBODIMENT 1

FIG. 1 is a sectional view illustrating a permanent magnet motor serving as a hollow shaft motor, according to the present invention. In this embodiment, a motor is a three-phase brushless motor composed of a rotor having 10 magnetic poles, and a stator having twelve coils. The stator side has a stator yoke or core 4 formed of a high density SMC, and is composed of a coil compact 5 which is extremely thin in the radial direction. The reason why the SMC is used in this stator is that the motor has multi-magnetic poles, and it is indispensable for decreasing eddy current caused by a rotating magnetic field. On the rotor side, a permanent magnet rotor is characterized by such a structure that a compact is formed by compacting a powder material, the compact being composed of a bond magnetic portion made of a binder and magnetic powder, and a soft magnetic portion made of a binder and soft magnetic powder, characterized in that the bond magnetic portion has magnetic poles having at least one surface which is mechanically coupled with the soft magnetic portion, in order to solve the above-mentioned problems. Further, the motor rotor has such structure that the bond magnet portion is formed of segments each manufactured by a provisional forming process, being applied with anisotropy during the provisional forming process, and the rotor is formed during a final forming process, having a plurality of magnetic poles obtained from the anisotropy, and thereafter, is magnetized by a magnetizing filed.

Figure 3:
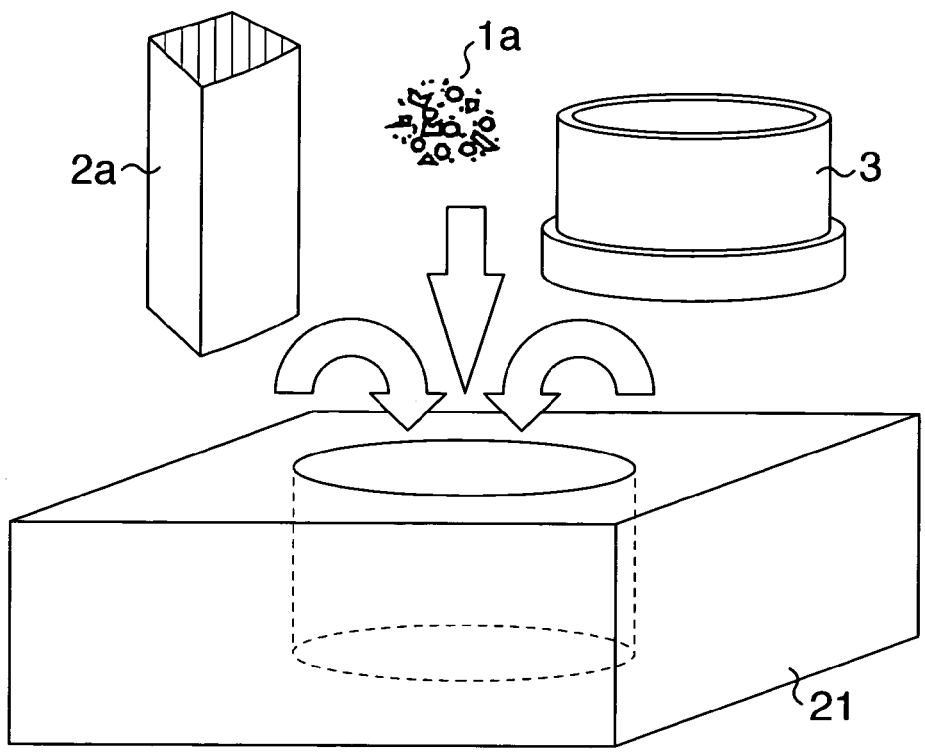
FIG. 3 is a view for explaining an image of a two color forming process according to the present invention.
Figure 4:
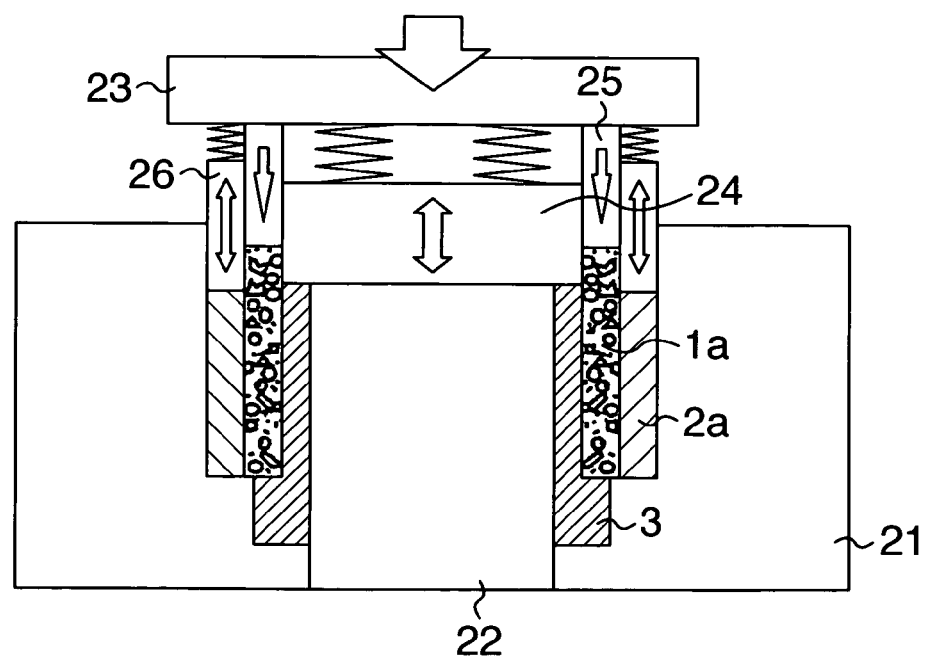
FIG. 4 is a view illustrating dies for compression molding in two color forming process.
Figure 5A:
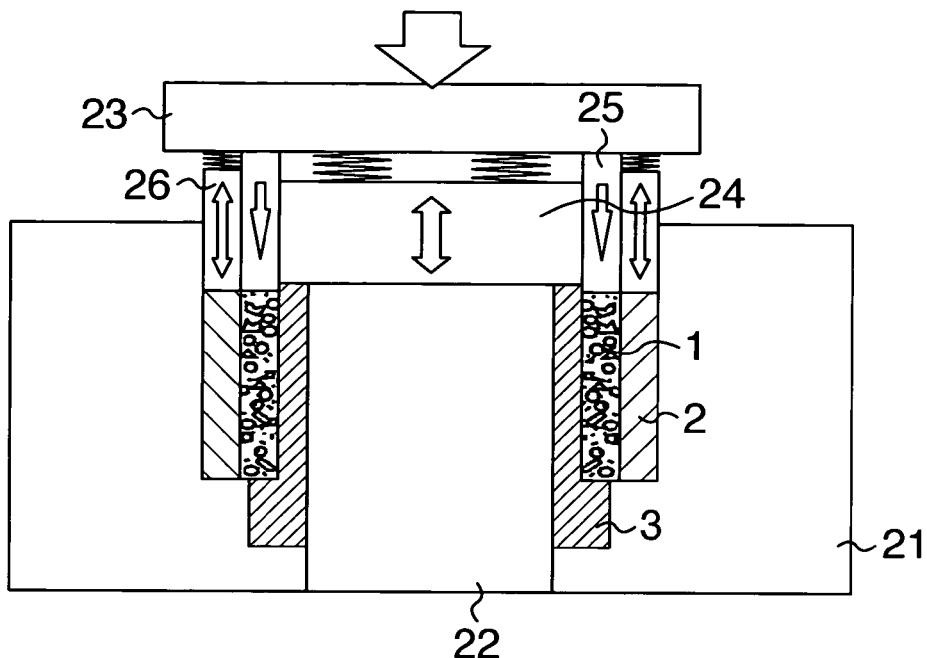
FIGS. 5(a) to 5(c) are views which show positional relations of the dies during compression molding in the two color molding process, compact taken up from the dies and the bound past of the compact.
Figure 5B:
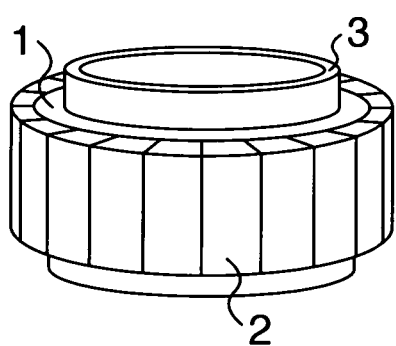
Figure 5C:
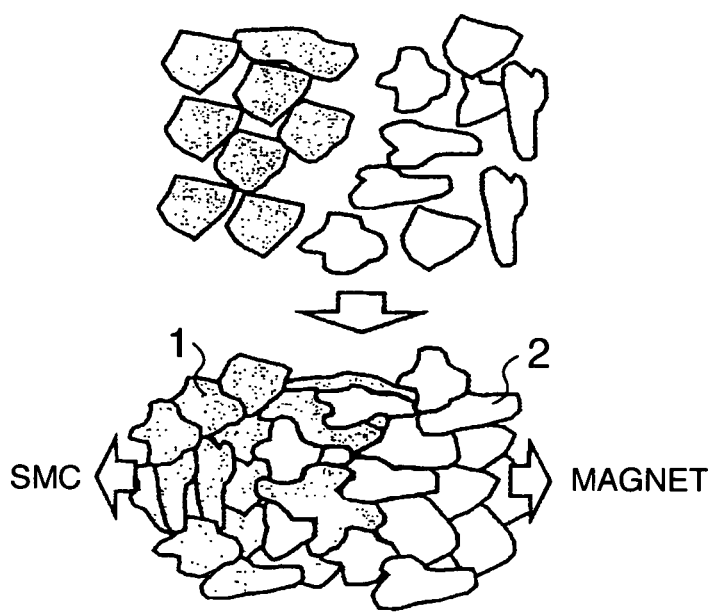

Referring to FIGS. 2(a) and 2(b), explanation will be made of a provisional forming process for a rotor magnet with the use of dies capable of orienting a magnetic field. Magnetic powder 8 and a thermoplastic or thermosetting binder 9 are blended with each other with a blending ratio appropriate for obtaining a required magnetic property, and the thus obtained blend is charged in the dies so as to be compacted with the use of a compression molding means, a injection molding means or the like. At this stage, the compaction is made while a coil 12, which is located within the provisional molding die 11, for orienting a magnetic field is energized so as to orient a magnetic field of the magnet with a high degree of accuracy. In the FIG. 2(b), reference numeral 2a denotes the provisionally formed compact, 13 denotes a provisional molding punch and 15 denotes an electric power supply. The provisionally formed compact 2a having the magnetic field precisely oriented is integrally formed with the SMC yoke (a final forming process). FIG. 3 shows an image of this final forming process. FIG. 4 shows a configuration of compression molding dies. FIG. 5(a) shows a positional relationship of the dies in a compression molding condition. At first, a shaft 3, a SMC powder material 1a and a provisionally formed compact 2a of the bond magnet are arranged in the dies at their respective necessary positions. At this time, the provisionally formed compact may be simply arranged with a sufficient peripheral clearance, having a dimensional relationship such as to be snugly fitted. The shaft 3 is held at its outer diameter part by a lower die 21 and at its inner diameter part by a core cylinder 22. The SMC powder material 1a is set between the shaft 3 and the magnet 2 by a measured amount with which a predetermined density may be obtained after compacting. In a condition in which the shaft is axially fixed by a holding plate 24 at its top, and compression forces are transmitted respectively by a first punch 25 and a second punch 26 of an upper punch assembly, which are moved up and down, independent from each other. For example, in this embodiment, the compression forces are transmitted from the upper plate 23 through the intermediary of springs. However, compression mechanisms which are independent from each other may be used. When the upper plate 23 is depressed by a compression drive source such as a press, the core cylinder 22 and the second punch 26 are applied thereto with pressing forces by spring forces corresponding to deflections of the springs therefor. The first punch 25 which is directly connected to the upper plate 23 directly transmits a compression stress of the upper plate 23 as a compression molding force to the SMC in order to carry out compression with a required dimensions. At this stage, the second plate should be also applied thereto with a sufficient compression force in order to continue the compression until the original axial dimensions of the provisionally formed molding are decreased. The positional relationship of the punches after the compression molding is as shown in FIGS. 5(a) to 5(c). In such a condition that the shaft 3 is inserted in the dies, the SMC yoke 1 and the bond magnetic compact 2 are integrally formed (the so-called two color molding). Referring to FIG. 5(b), which is a perspective view illustrating the compact taken up from the dies, there may be obtained the compact in which the shaft 3, the SMC yoke portion 1 and the bond magnet compact 2 are firmly bound together. FIG. 5(c) shows the bound part of the compact in a microscopic view. The SMC powder 1 and the magnetic powder 2 of the provisionally formed magnet compact are bonded with each other with a higher mechanical strength at their interface where they are bonded together due to a bonding effect by the binder (a resin material) and as well due to occurrence of mechanical entanglements of powder particles caused by plastic deformation during compression molding. Conventionally, in the case of coupling a shaft to a sintered rare earth magnet or a bond magnet composed of magnet segments or formed by injection molding, it has been required to protect the outer surface of the magnet with a binding tape containing glass fibers or carbon fibers. On the contrary, in this embodiment, a tensile strength (40 to 60 MPa) with which the necessity of the protection may be eliminated, may be obtained. Thus, there may be obtained a rotor without the necessity of protection of the outer surface thereof by a binding tape containing glass fibers and carbon fibers.

Figure 8A:
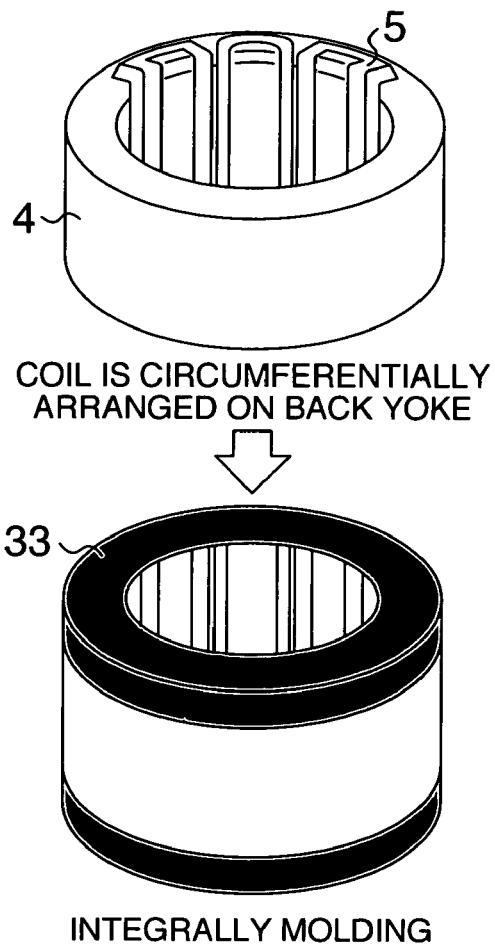
FIGS. 8(a) to 8(c) are views illustrating structural examples of a hollow shaft motor utilizing the two color molding rotor structure according to the present invention.
Figure 8B:
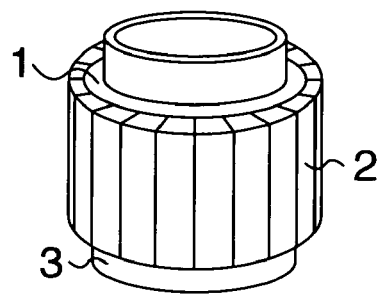
Figure 8C:
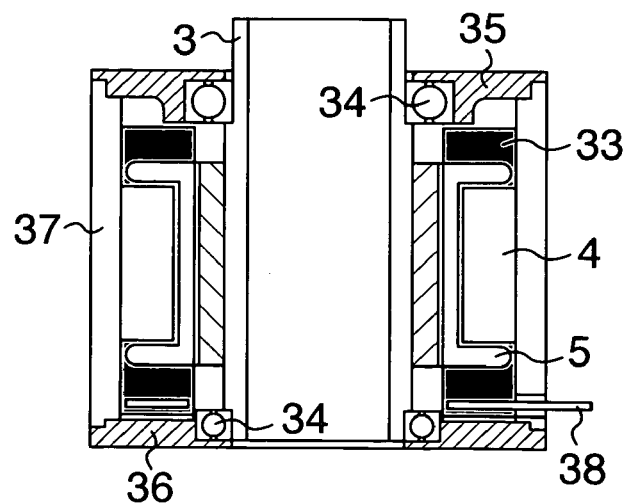

Referring to FIGS. 8(a) to 8(c), which show a structural example of a hollow shaft coreless motor utilizing the rotor configuration as stated above, a coil 5 which is extremely thin in a radial direction is at first arranged circumferentially in a ring-like back yoke 4 using a silicon steel plate layer, an SMC or the like on the stator side. The coil 5 and the core 4 are integrally secured to each other by molding, bonding or the like so as to prevent the coil 5 from being shifted by an electro magnetic force. On the rotor side, a rotor having a high degree of accuracy with respect to the diametrical dimensions, axial dimensions and concentricity is obtained by the above-mentioned two colors molding. At this stage, the mechanical gap dimensions between the stator and the rotor may be designed in consideration of less assembly tolerance. This rotor magnet is a rare earth bond magnet having a maximum energy product smaller than that of the sintered rare earth magnet. Thus, it is preferable to design a motor so that the outer diameter part is as large as possible in order to increase an effective induced voltage. Accordingly, since no inner diameter part is required, it is desired that the inner diameter part of the shaft 3 is hollow as shown. FIG. 8(c) shows a configuration of the motor in which the stator and the rotor are assembled together. The stator is held by a housing 37 having opposite ends at which end brackets (bearing holding parts) 35, 36 are arranged by faucet parts. The shaft 3 is held through the intermediary of bearings 34 which are held by the end brackets 35, 36. As stated above, since the rotor magnet 2 has a larger diameter while the stator coil 5 is thinner, the shaft 3 may have a hollow structure.

Figure 6A:
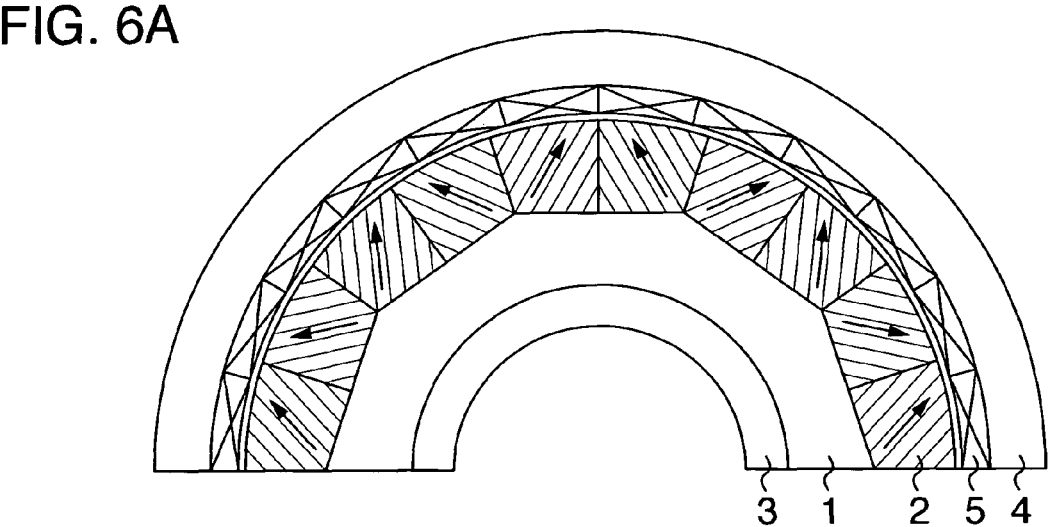
FIGS. 6(a) to 6(c) are views which show comparison between the motor according to the present invention and a motor having a conventional structure.
Figure 6B:
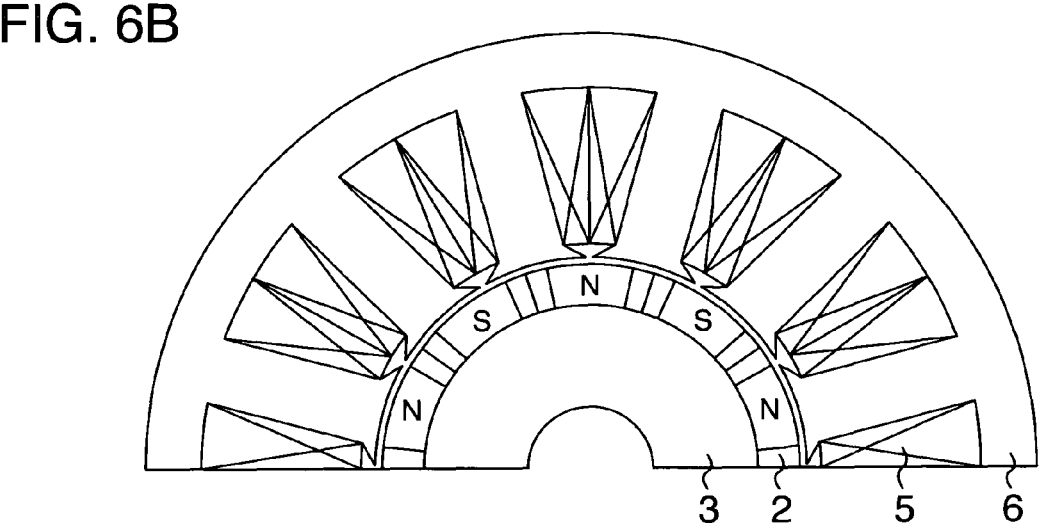
Figure 6C:
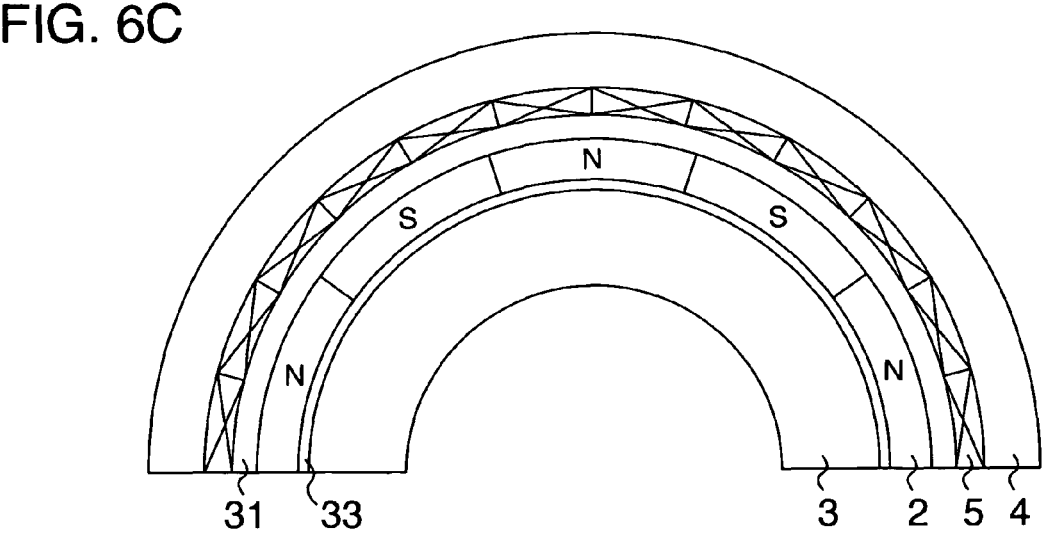

Referring to FIGS. 6(a) to 6(c) which show comparison between the motor according to the present invention and conventional motors, FIG. 6(a) shows the hollow shaft motor of a coreless type incorporating a two color molded rotor, and a stator having an inner diameter of 58 mm, the rotor having an outer diameter of 57.2 mm. An air gap dimension of 0.4 mm may be sufficiently achieved even in view of dimensional tolerance of the magnetic surface with respect the shaft 3 due to the two color molding. The residual magnetic flux density Br of the magnet is equal to 0.88 T, and the rotor is formed by the two-color molding provided with anisotropy in the direction as shown. FIG. 6(b) shows a conventional motor with a slot type core, composed a stator having an inner diameter of 34.8 mm and a rotor having an outer diameter of 34 mm with an air gap dimension of 0.4 mm which is equal to that of the structure shown in FIG. 6(a). The residual magnetic flux density Br of the magnet is equal to 1.2 T, and a sintered ring magnet having a thickness of 3 mm is used. In the case of a small diameter magnet, a bonding zone having about 0.1 mm is provided on the inner diameter side, and accordingly, the bonding is made with an adhesive having a high viscosity so as to obtain a sufficient bonding strength. Thus, since a gap having 0.4 mm is sufficient as far as the motor is not used in an extremely severe condition, the gap dimension is set to be equal to that of the motor in the present invention. The configuration of this motor is in general prosperously used as a conventional motor, but it has no hollow shaft. FIG. 6(c) shows a configuration of a motor of coreless type using a sintered rare earth radial ring magnet. In this case, since a torque transmission diameter is larger, the thickness of the magnet is increased up to 4 mm. The magnet having the increased thickness may increase a magnetic flux value and a mechanical strength, but effective radial orientation with a high degree of accuracy can hardly be obtained during the compacting of the magnet. Thus, the residual magnetic flux density is set to 1.05 T. Further, in the case of the presence of radial anisotropy, thermal expansion coefficients in the radial direction and the circumferential direction are remarkably different from each other, and accordingly, ensuring of a strength is indispensable for the magnet having this configuration with a large diameter. Thus, a bonding zone 31 on the inner diameter side and a binding tape 32 containing glass fibers or carbon fibers or a thin nonmagnetic material for protecting the outer surface of the magnet are required. Thus, the air gap dimension in view of a magnetic circuit becomes large in comparison with the configuration shown in FIG. 6(a), and the outer diameter of the rotor having the stator inner diameter of 58 mm which is equal to the configuration shown in FIG. 6(a) has to be set to 56 mm.

FIG. 7 shows comparison of induced voltages of the motors having the configurations shown in FIGS. 6(a) to 6(c). In such a case that the number of windings per phase is set to be equal to each other, the induced voltages having effective values which are substantially equal to each other may be obtained as to the motors having the configurations shown in FIGS. 6(a) and 6(b). The configuration shown in FIG. 6(c) is disadvantageous due to a large gap dimension, and accordingly, the induced voltage obtained thereby is small. Thus, the motor having the two color molded rotor according to the present invention may have a hollow shaft structure which can produce a high output power even though the residual magnetic flux density is low.

Although explanation has been hereinabove made of the motor of an internal revolution type, similar results may be obtained even with a motor of external revolution type in which the rotor is arranged outside.

EMBODIMENT 2

Next explanation will be made of a second embodiment. As to the SMC and the magnet of the hollow shaft permanent magnet motor according to the present invention, the higher the molding density and the more excellent the insulation, the higher the property of the hollow shaft permanent magnet motor. It is required to increase the pressure for press molding in order to enhance the molding density. However, should the pressure be excessively high, an insulation film on the magnetic powder surface would be broken, resulting in an increase in eddy current loss. Should the thickness of the insulation film be set to be larger in order to maintain the insulation, lowering of an energy product of a magnet, lowering of magnetic permeability due to insufficient density would be caused, resulting in remarkable lowering of the motor property. In order to simultaneously satisfy these properties contrary to each other, it may be considered to strengthen the film of the magnetic powder.

As to a method for forming an insulation film, there may be enumerated a method in which plate-like fluorine compounds are formed at grain boundaries in order to increase interfaces between the fluorine compounds and the main phase, and a method in which the thickness of the fluorine compound is reduced and a method in which fluorine compound has a ferromagnetic phase. The former is effective if a technique for forming plate-like or flat fluorine compounds is used during formation of powder of the fluorine compound. As disclosed in JP-A-2003-282312 as a conventional example, $NdF_3$ powder having an averaged grain size of 0.2 μm and NdFeB alloy powder are mixed with each other with the use of an automatic milk bowl in the case of $NdF_3$, but this document fails to disclose the shape of the fluorine compound, and the fluorine compound is agglomerated after sintering. On the contrary, in an example of the technique according to the present invention, the shape of the fluorine compound power is stratified after the formation of a magnet. In order to stratify the shape of the fluorine compound powder after formation of a magnet, the powder shape of the fluorine compound to be used is set to be plate-like. In an example of the technique for the plate-like product, the fluorine compound is melted and quenched. The melting temperature is about 2,000 deg.C., and the quenching rate after the melting is $10^5$ deg.C./sec. By the quenching, the plate-like fluorine compound having a thickness of not greater than 10 μm and an aspect ratio of not less than 2 may be obtained. Other than the use of the plate-like powder, there may be used such a forming technique that the main phase and fluorine compound are heated and pressurized so that the fluorine compound is stratified along the grain boundary. The fluorine compound which is stratified along the grain boundary after molding increases the area of the interface between the fluorine compound and the main phase, in comparison with the agglomerated or granular fluorine compound, and is formed along the grain boundary after the molding. The stratified fluorine compound may enhance the magnetic property by fluoride although the mixing quantity thereof is small. Further, as to ferromagnetization of the fluorine compound, the fluorine compound is added thereto with Fe or Co and is then formed into powder or a thin belt by way of a quenching process. The fluorine compound is paramagnetic so that its magnetization is small at a room temperature. Thus, by mixing the fluorine compound into the main phase, the residual magnetic flux density is decreased approximately in proportion to its mixing quantity. The decreasing of the residual magnetic flux density results in remarkable lowering of the energy product. In a magnetic circuit which is so designed that the magnetic flux density of a magnet is high, the formation of a conventional magnet containing fluorine compound has been impossible. However, if the fluorine compound can be ferromagnetized, the values of the saturated magnetic flux density and the residual magnetic flux density can be increased by adding the fluoride even though the adding amount of the fluorine compound is equal to that of the conventional magnet. Further, even though the fluorine compound exhibits ferromagnetism, the magnetic coercive force and the angulation of the main phase is detrimentally affected unless the magnetic coercive force of the fluorine compound itself becomes higher. In order to enhance the residual magnetic flux density while the magnetic coercive force of the main phase is maintained with its angulation being ensured, it is required to increase the magnetic coercive force of the fluorine compound. By setting the magnetic coercive force of the fluorine compound to a value not less than 1 KOe, the decreasing of the residual magnetic flux density can be reduced while the magnetic coercive force and the angulation of the main phase are ensured. In order to form the fluorine compound having such a magnetic coercive force, there is applied a technique for melting and quenching fluorine compound and a ferromagnetic material. A single roll process or a double roll process may be used for the quenching.

Specifically manufacturing examples will be described hereinbelow. NdFeB alloy is a powder having a grain size of about 100 μm applied thereto with a hydride dehydrogenation process, having a magnetic coercive force of 16 KOe. The fluorine compound to be added to this NdFeB powder is $NdF_3$. $NdF_3$ raw material powder is quenched with the use of a quenching apparatus so as to form plate-like or ribbon-like powder. The raw material powder 102 is melted by arc melting by a tungsten electrode 103 in an inert gas atmosphere 101, and melted $NdF_3$ is sprayed onto a roll 105 from a nozzle 104 by opening a shutter 107. Ar gas is used as the inert gas, and the single roll 105 is made of Cu or Fe group materials. The Ar gas is pressurized on the single roll which is rotating at a speed of 500 to 5,000 rpm, and the spraying is made with the use of a differential pressure. The thus obtained $NdF_3$ powder becomes plate-like. This $NdF_3$ powder and the NdFeB powder were mixed to each other so that the $NdF_3$ became about 10 wt %. The mixed powder was oriented by a magnetic field of 10 KOe and was compressed, and was heated and compression-molded in the atmosphere of Ar gas. Under the molding condition in which a heating temperature was 700 deg.C. and a compressing pressure was 3 to 5 t/cm$^2$, anisotropic magnets having 7 mm×7 mm×5 mm was manufactured. Each of manufactured compacts had a density of not less than 7.4 g/cm$^2$. The compact magnets was applied thereto with a pulse magnetic field of not less than 30 KOe in the direction of anisotropy of the magnet, and a demagnetization curve was measured at a temperature of about 20 deg.C. The thickness of the $NdF_3$ was an averaged thickness of $NdF_3$ layers which were present at the grain boundaries of the $Nd_2Fe_{14}B$ particles. The thickness of the $NdF_3$ was different depending upon a power forming condition thereof, a heating and compression molding condition, a shape of NdFeB powder and the like. In order to change the thickness of the $NdF_3$, the speed of the roll was changed from 500 to 5,000 rpm during the manufacture of the $NdF_3$, and the pulverized powder was further sorted by a mesh or the like. If the rotating speed is higher while the pressure of the compression molding is higher, the thickness of the $NdF_3$ may become less. If the $NdF_3$ becomes thicker from 0.01 μm, the values of the Br (residual magnetic flux density), the iHc (magnetic coercive force) and the Bhmax (energy product) tend to increase. The iHc is remarkably increased in the thickness range of the $NdF_3$ from 0.1 to 10 μm, and the Br is also increased in this range. The presence of the $NdF_3$ at the interface results in the increase of the magnetic coercive force. However, it has been considered that the ferromagnetic bond between the particles becomes weaker as the thickness of the $NdF_3$ is increased since the $NdF_3$ is paramagnetic. The reason why the Br is increased, is that the magnetic flux density is increased in a low magnetic field. The temperature dependency of the magnetic coercive force of the magnet having a thickness of $NdF_3$ of 1.0 μm was measured, being heated under the atmosphere, and as a result, the temperature coefficient of the magnetic coercive force was 5.0%/deg.C. in the case of a magnet added with no $NdF_3$. If the thickness of the $NdF_3$ is increased, the temperature coefficient of the magnetic coercive force is decreased. The effect is remarkable in the thickness range of the $NdF_3$ of 0.1 to 10 μm, and the temperature coefficient of the magnetic coercive force becomes 3.4%/deg.C. at minimum. The reasons of this have been considered that the $NdF_3$ prevents the main phase from being oxidized, and that the magnetic domain is stabilized due to the increase of the magnetic coercive force. The result of the averaged coverage of fluoride for the main phase, which is about 50%, the coverage dependency is exhibited if the coverage is changed in the thickness range of the $NdF_3$ of 0.1 to 10 μm. The coverage is dependent upon parameters and conditions, such as a mixing condition of the fluoride powder, a grain size of the fluoride powder, a grain size of the NdFeB powder, a shape of the NdFeB powder, an orientating magnetic field, a pressure upon orientation, a heating condition and the like. As the coverage is increased, the magnetic coercive force tends to increase.

With the use of the magnetic powder prepared in the above-mentioned method, a rotor for a hollow shaft motor is formed, which can hardly be thermally demagnetized, and which is strong against a reverse magnetic field with the use of a hard magnetic material having a small temperature coefficient of the magnetic coercive force, which is less in temperature dependency of induced voltage, and which may stably produce a power up to a high temperature.

EMBODIMENT 3

Figure 9A:
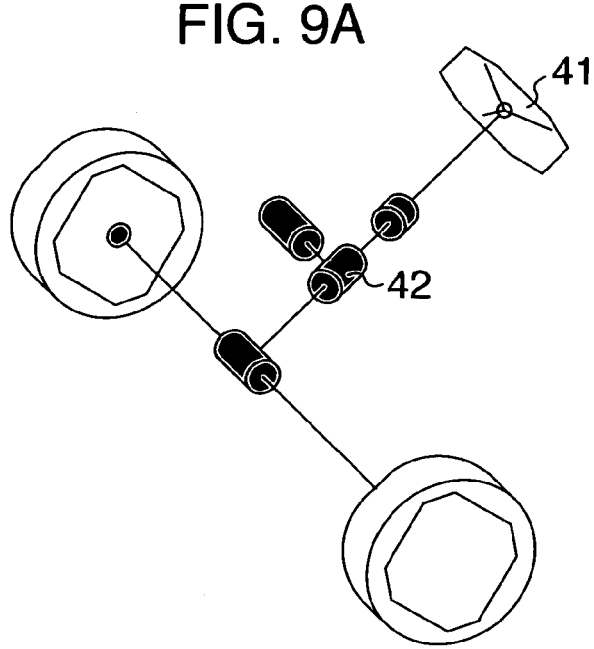
FIGS. 9(a) to 9(c) are views for explaining an automobile power steering system utilizing the motor according to the present invention.
Figure 9B:
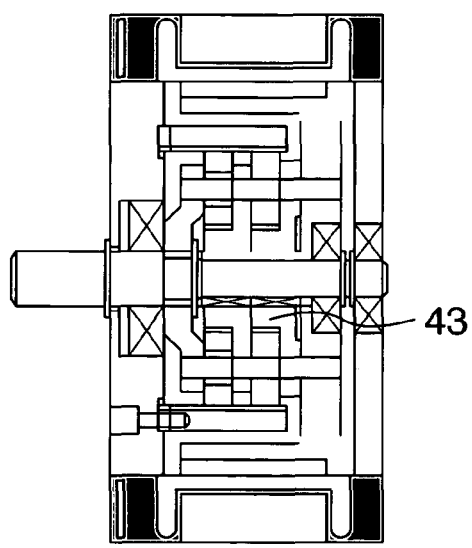
Figure 9C:
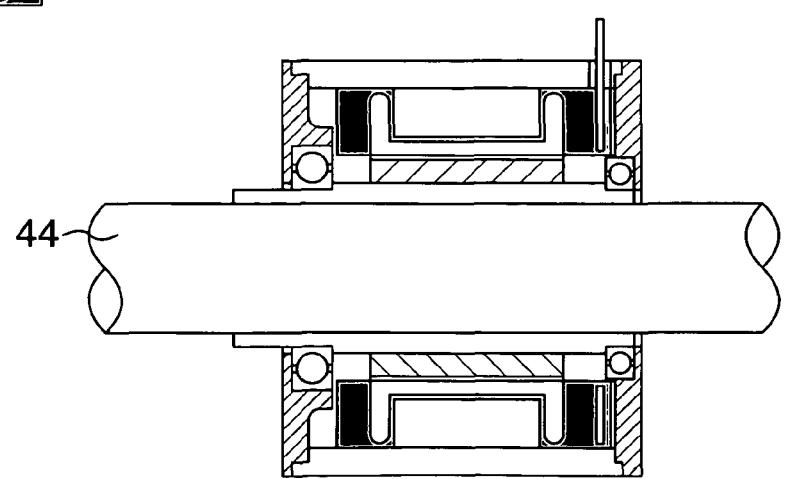

Next, explanation will be made of a system utilizing the hollow shaft motor according to the present invention. FIGS. 9(a) to 9(c) show an example of a system in which technical effects may be expected by using the hollow shaft motor according to the present invention. FIG. 9(a) schematically shows an automobile power steering system. The power steering system comprises a handle 41 and a motor 42. The automobile power steering system has been hydraulically driven, however, since the performance of the motor have been these years enhanced, a power steering system driven by an electric motor becomes available more or less. A motor for driving the steering system is adapted to rotate when the driver manipulates a steering wheel, in order to assist the manipulation, and accordingly, it produces a drive force for changing the direction of wheel tiers. However, in order to remove a heavy load when the motor is rotated due to the operation of the steering wheel by the motor, it is required to decrease loss torque of the motor itself. Thus, a motor having no core may eliminate hysteresis loss of a core, and according, it is possible to attain its object. Further, the efficiency thereof in a predetermined output power range may be higher than that of a motor using a silicon steel sheet, and accordingly, this system is optimum in use in which a power is fed from a battery as in an automobile so as to have to consider the fuel consumption. Further, since no core is required, the occupancy rate of windings may be increased, and the bulk (volume) of the motor become less. Further, as shown in FIG. 9(b), with the use of the hollow part, the mechanical components such as planetary gears 43 and a ball screw mechanism 44 as shown in FIG. 9(c) are arranged internally. Accordingly, it is easy to mount the gear system in a boarding space which is limited in an automobile.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A hollow shaft motor comprising at least one air core coil as a stator arranged at an outer periphery and a rotor, wherein the rotor comprises an SMC (soft magnetic composite) and at least two adjacent compacted magnet members associated and arranged so that each compacted magnet member has a magnetization oriented in a direction different from each of the directions of magnetization of the associated adjacent compacted magnet members, and two adjacent compacted magnet members form at least one magnet pole common to both adjacent compacted magnet members, wherein each of the compacted magnet members is formed from a provisionally formed compact applied with a predetermined anisotropy via a magnetic field applied during a provisional forming process prior to associating the compacted magnet members with the SMC.

2. A motor as set forth in claim 1, wherein the stator further comprises a back yoke part of the stator formed of the SMC.

3. A motor as set forth in claim 1, wherein the stator further comprises a back yoke part of the stator formed of the SMC, and the SMC is integrally incorporated with the air coil by resin molding.

4. A motor as set forth in claim 1, wherein a layer containing stratified fluorine is formed in a portion or an entire grain boundary or a powder surface of $Nd_2Fe_{14}B$ which is a main phase of a R—Fe—B (where R is rare earth element) group magnet, as an insulation coating of a magnetic powder, and the layer contains a fluorine compound composed of an alkali earth or rare earth element, the thickness of the grain boundary formed fluorine compound is not greater than 10 μm so that the insulation coating has a high coercive force, and the rare earth magnet with the insulation coating is integrally molded with the SMC.

5. An automobile power steering motor using as a drive source the hollow shaft magnetic motor as set forth in claim 1.

6. A motor as set forth in claim 1, wherein the rotor comprising the SMC and the at least one compacted magnet member is an integrated unit.

7. A magnetic motor set forth in claim 6, wherein the SMC (soft magnetic composite) and the at least one compacted magnet member are arranged in the integrated unit without a gap or separation at boundaries between the SMC and the at least one compacted magnet member.

8. A motor comprising a stator and a rotor, the rotor including a rotor magnet comprising compact elements obtained by compression molding a magnet parts formed by using provisionally formed magnet compact elements which are provisionally formed in order to form a magnet magnetizing direction and to obtain a predetermined initial shape, the rotor being formed by integrally molding the compact elements and an SMC (soft magnetic composite) or the compact elements, the SMC and a shaft, wherein the motor is a hollow shaft motor comprising an air core coil as a stator, and wherein the rotor magnet is separated into a plurality said compact elements per pole, the provisionally formed magnet compact elements being provisionally formed so that a magnet magnetizing direction is provisionally formed in the magnet parts such that the magnetizing direction thereof becomes a one point conversion type magnetic orientation, the compact elements and the SMC being integrally molded, or the compact elements, the SMC and the shaft being integrally molded so as to form the rotor, wherein the provisionally formed magnet compact elements are each applied with a predetermined anisotropy via a magnetic field during a provisional forming process prior to the compact elements being integrally molded with the SMC or with the SMC and the shaft.

9. A motor as set forth in claim 8, wherein the rotor is manufactured by integrally molding the rotor magnet, the SMC and the shaft in the same dies by simultaneously applying a compressing direction pressure to at least the SMC or the magnet part in an axial direction.

10. A motor as set forth in claim 8, wherein the rotor includes a bonded part which is bonded by bonding due to plastic deformation from an original shape of a powder by compression stress at an interface between the magnet of the rotor and the SMC or between the shaft and the SMC.

11. A motor as set forth in claim 9, wherein the rotor includes a bonded part which is bonded by bonding due to plastic deformation from an original shape of a powder by compression stress at an interface between the magnet of the rotor and the SMC or between the shaft and the SMC.

12. A motor as set forth in claim 8, wherein a layer including stratified fluorine is formed in a part or an entire part of a grain boundary or a powder surface of $Nd_2Fe_{14}B$ which is a main phase of a R—Fe—B (where R is a rare earth element) group magnet, as an insulation coating of a magnetic powder, and the layer further includes a fluorine compound comprised of an alkali earth or rare earth element, the thickness of the grain boundary formed fluorine compound is not greater than 10 μm so that the insulation coating has a high coercive force, and the high magnetic coercive force rare earth magnet with the insulation coating is integrally molded with the SMC.

13. A motor as set forth in claim 9, wherein a layer including stratified fluorine is formed in a part or an entire part of a grain boundary or a powder surface of $Nd_2Fe_{14}B$ which is a main phase of a R—Fe—B (where R is a rare earth element) group magnet, as an insulation coating of a magnetic powder, and the layer further includes a fluorine compound comprised of an alkali earth or rare earth element, the thickness of the grain boundary formed fluorine compound is not greater than 10 μm so that the insulation coating has a high coercive force, and the high magnetic coercive force rare earth magnet with the insulation coating is integrally molded with the SMC.

14. A motor as set forth in claim 10, wherein a layer including stratified fluorine is formed in a part or an entire part of a grain boundary or a powder surface of $Nd_2Fe_{14}B$ which is a main phase of a R—Fe—B (where R is a rare earth element) group magnet, as an insulation coating of a magnetic powder, and the layer further includes a fluorine compound comprised of an alkali earth or rare earth element, the thickness of the grain boundary formed fluorine compound is not greater than 10 μm so that the insulation coating has a high coercive force, and the high magnetic coercive force rare earth magnet with the insulation coating is integrally molded with the SMC.

15. An automobile power steering motor using as a drive source the hollow shaft magnetic motor as set forth in claim 8 incorporating the rotor which is formed by integrally molding the rotor magnet, the SMC and the shaft in the same dies, and by applying a compression direction pressure in the axial direction, to at least the SMC or the magnet part.

16. A motor as set forth in claim 1, wherein said compacted magnet members are formed by magnetizing the provisionally formed compacts during a process, subsequent to the provisional forming process, of molding the provisionally formed compacts to the SMC.

17. A motor as set forth in claim 8, wherein said provisionally formed magnet compact elements are formed by magnetizing the provisionally formed magnet compact elements during a process, subsequent to the provisional forming process, of integrally molding the compact elements to the SMC or to the SMC and the shaft.

* * * * *